United States Patent
Huang et al.

(10) Patent No.: US 9,166,398 B2
(45) Date of Patent: Oct. 20, 2015

(54) CONTROLLER PROVIDING PROTECTION FUNCTION AND FREQUENCY-REDUCTION FUNCTION USING A SINGLE PIN AND SYSTEM USING SAME

(71) Applicant: Zentel Electronics Corp., Hsinchu (TW)

(72) Inventors: Jun Hsiung Huang, Hsinhu (TW); Yu Wen Chang, Hsinchu (TW)

(73) Assignee: Zentel Electronics Corp., Hsinchu (TW)

( * ) Notice: Subject to any disclaimer, the term of this patent is extended or adjusted under 35 U.S.C. 154(b) by 265 days.

(21) Appl. No.: 14/020,456

(22) Filed: Sep. 6, 2013

(65) Prior Publication Data

US 2015/0070945 A1 Mar. 12, 2015

(51) Int. Cl.
*H02M 3/335* (2006.01)
*H02H 7/12* (2006.01)

(52) U.S. Cl.
CPC .................................. *H02H 7/1213* (2013.01)

(58) Field of Classification Search
USPC ................................................ 363/21.13, 163
See application file for complete search history.

(56) References Cited

U.S. PATENT DOCUMENTS

| 7,239,532 B1 * | 7/2007 | Hsu et al. .................... 363/21.12 |
| 8,213,192 B2 * | 7/2012 | Konecny et al. ........... 363/21.13 |
| 2010/0008110 A1 * | 1/2010 | Huang et al. ................ 363/21.18 |

* cited by examiner

*Primary Examiner* — Timothy J Dole
*Assistant Examiner* — Lorena Bruner
(74) *Attorney, Agent, or Firm* — Ming Chow; Sinorica, LLC

(57) ABSTRACT

A controller providing protection function and frequency-reduction function for a power conversion application, including: a voltage sense pin; a current source; a switch having a first end coupled to the current source, a second end coupled to the voltage sense pin, and a control end coupled with a control signal; and a sampling unit having a first node coupled to the voltage sense pin, a second node for providing the control signal, a third node for receiving a PWM signal, a fourth node for providing a first sampled voltage for a protection function, and a fifth node for providing a second sampled voltage for a frequency-reduction function.

10 Claims, 3 Drawing Sheets

CONTROLLER PROVIDING PROTECTION FUNCTION AND FREQUENCY-REDUCTION FUNCTION USING A SINGLE PIN AND SYSTEM USING SAME

BACKGROUND OF THE INVENTION

1. Field of the Invention

The present invention relates to a controller for power conversion, especially to a controller using a single pin to provide a protection function and a frequency-reduction function for a power conversion application.

2. Description of the Related Art

As energy efficiency and safety of a power converter are more and more demanded globally, the controller thereof is required to provide more and more power-saving and power-protection functions. However, due to limited number of pins, most small-form-factor controllers are hindered from implementing such functions.

One solution is to use a package of larger pin count. However, this will increase the manufacturing cost—as both the package size and the board area will increase. Besides, a controller with a larger pin count can be incompatible with the existing architectures of the power converters.

To solve the foregoing problem, a novel controller is needed.

SUMMARY OF THE INVENTION

One objective of the present invention is to disclose a controller providing a protection function and a frequency-reduction function for power conversion applications using a single pin.

Another objective of the present invention is to disclose a controller providing a protection function and a frequency-reduction function for power conversion applications without the need of a larger pin count.

Still another objective of the present invention is to disclose a system having a controller using a single pin to provide a protection function and a frequency-reduction function for power conversion applications.

To attain the foregoing objectives, a controller providing protection function and frequency-reduction function for a power conversion application is proposed, including:

a voltage sense pin;

a current source;

a switch having a first end coupled to the current source, a second end coupled to the voltage sense pin, and a control end coupled with a control signal;

a sampling unit having a first node coupled to the voltage sense pin, a second node for providing the control signal, a third node for receiving a PWM signal, a fourth node for providing a first sampled voltage, and a fifth node for providing a second sampled voltage, wherein when the PWM signal is at a first level, the control signal will be inactive and the switch will be off, and the sampling unit will sample a voltage at the voltage sense pin to generate the first sampled voltage; when the PWM signal is at a second level, which is different from the first level, the control signal will be active to switch on the switch, and the sampling unit will sample a voltage at the voltage sense pin to generate the second sampled voltage;

a comparator having a positive input end coupled with the first sampled voltage, a negative input end coupled with a reference voltage, and an output end for providing a protection signal;

a threshold voltages generation unit having a sixth node for receiving the second sampled voltage, a seventh node for providing a first threshold voltage according to a first function of the second sampled voltage, an eighth node for providing a second threshold voltage according to a second function of the second sampled voltage, and a ninth node for providing a third threshold voltage according to a third function of the second sampled voltage, wherein the first threshold voltage is higher than the second threshold voltage and the second threshold voltage is higher than the third threshold voltage; and a PWM unit having a tenth node for receiving a feedback voltage from a load via a feedback circuit, and an eleventh node for providing the PWM signal of a switching frequency, wherein the PWM unit adjusts the switching frequency in response to the feedback voltage in a way that the switching frequency starts to decrease from a first frequency when the feedback voltage falls below the first threshold voltage, the switching frequency stops decreasing and then remains at a second frequency when the feedback voltage falls below the second threshold voltage, and the PWM signal enters a green mode when the feedback voltage falls below the third threshold voltage; and wherein the PWM unit will shut down the PWM signal when the protection signal is active.

To make it easier for our examiner to understand the objective of the invention, its structure, innovative features, and performance, we use preferred embodiments together with the accompanying drawings for the detailed description of the invention.

DETAILED DESCRIPTION OF THE PREFERRED EMBODIMENTS

The present invention will be described in more detail hereinafter with reference to the accompanying drawings that show the preferred embodiments of the invention.

Figure 1:
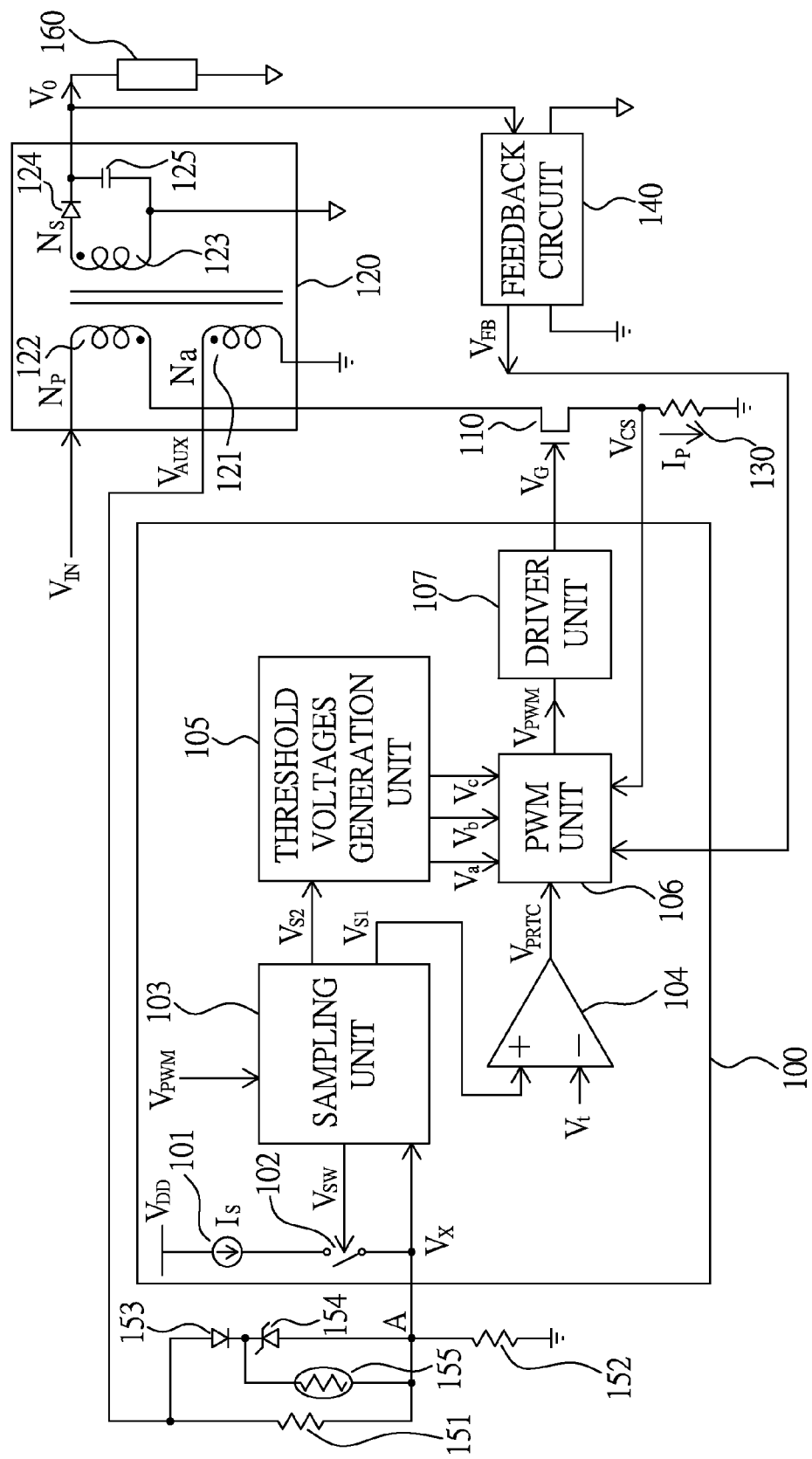
FIG. 1 illustrates a circuit diagram of a power converter using a controller of the present invention according to a preferred embodiment of the present invention.

Please refer to FIG. 1, which illustrates a circuit diagram of a power converter using a controller of the present invention according to a preferred embodiment of the present invention. As illustrated in FIG. 1, a power converter includes a controller 100, a power transistor 110, a power transmission unit 120, a current sensing resistor 130, a feedback circuit 140, a first resistor 151, a second resistor 152, a diode 153, a Zener diode 154, and a thermal resistor 155. The power converter, converting an input voltage $V_{IN}$ to an output voltage $V_O$ for a load 160, provides a protection function and a frequency-reduction function via a single pin of the controller 100.

The controller 100, including a current source 101, a switch 102, a sampling unit 103, a comparator 104, a threshold voltages generation unit 105, a PWM (pulse width modulation) unit 106, and a driver unit 107, has a voltage sense pin A for implementing the protection function and the frequency-reduction function.

The current source 101 is used to provide a current when the switch 102 is on.

The switch 102 has a first end coupled to the current source 101, a second end coupled to a voltage sense pin A of the controller 100, and a control end coupled with a control signal $V_{SW}$.

The sampling unit 103 has a first node coupled to the voltage sense pin A, a second node for providing the control signal $V_{SW}$, a third node for receiving a PWM signal $V_{PWM}$, a fourth node for providing a first sampled voltage $V_{S1}$, and a fifth node for providing a second sampled voltage $V_{S2}$. When the PWM signal $V_{PWM}$ is at a low level, the control signal $V_{SW}$ will be inactive and the switch 102 will be off, and the sampling unit 103 will sample a voltage $V_X$ at the voltage sense pin A to generate the first sampled voltage $V_{S1}$; when the PWM signal $V_{PWM}$ is at a high level, the control signal $V_{SW}$ will be active to turn on the switch 102, and the sampling unit 103 will sample the voltage $V_X$ at the voltage sense pin A to generate the second sampled voltage $V_{S2}$.

The comparator 104 has a positive input end coupled with the first sampled voltage $V_{S1}$, a negative input end coupled with a reference voltage $V_t$, and an output end for providing a protection signal $V_{PRTC}$.

The threshold voltages generation unit 105 has a sixth node for receiving the second sampled voltage $V_{S2}$, a seventh node for providing a first threshold voltage $V_a$ according to a first function of the second sampled voltage $V_{S2}$, an eighth node for providing a second threshold voltage $V_b$ according to a second function of the second sampled voltage $V_{S2}$, and a ninth node for providing a third threshold voltage $V_c$ according to a third function of the second sampled voltage $V_{S2}$, wherein $V_a > V_b > V_c$. The first function, the second function, and the third function are preferably but not limited to first order polynomial functions. For example, $V_a$ can be equal to $K_1*V_{S2}+V_{dc1}$, $V_b$ can be equal to $K_2*V_{S2}+V_{dc2}$, and $V_c$ can be equal to $K_3*V_{S2}+V_{dc3}$, wherein $K_1, K_2, K_3, V_{dc1}, V_{dc2}$, and $V_{dc3}$ are constants.

Figure 2:
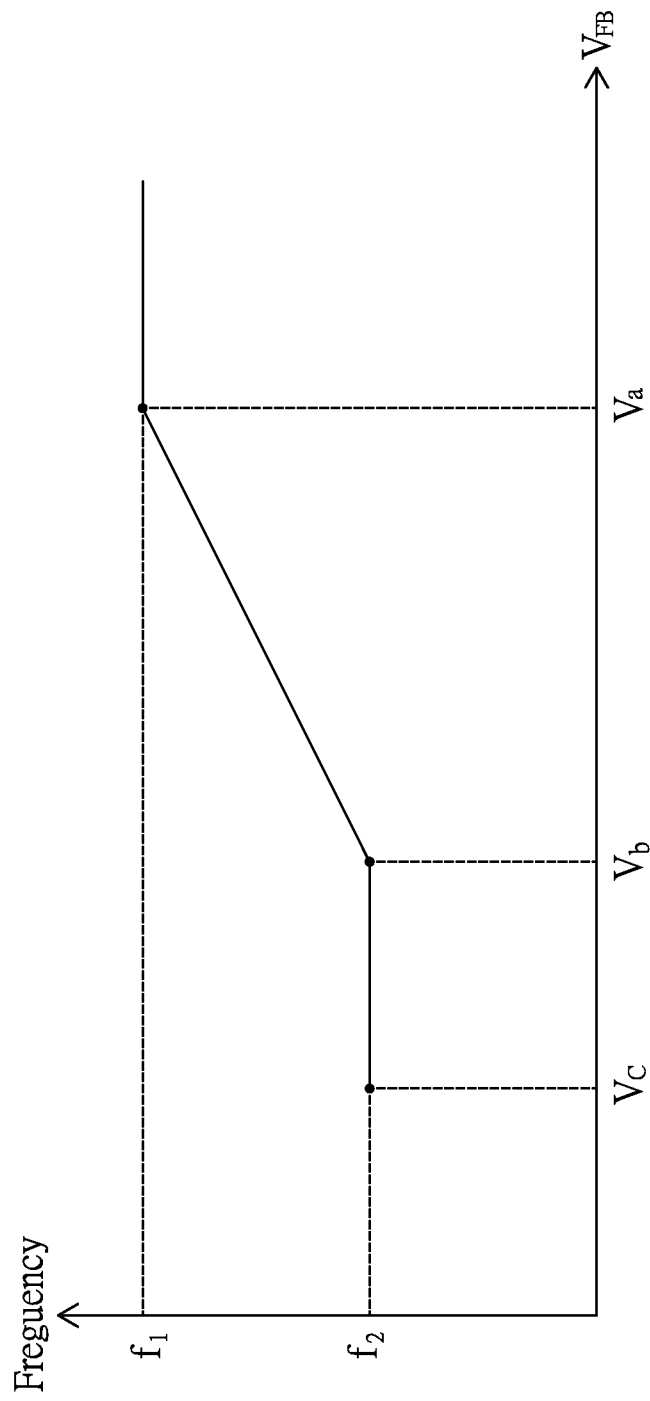
FIG. 2 illustrates an arrangement of an operation frequency in response to a feedback voltage of the power converter of FIG. 1.

The PWM unit 106 has a tenth node for receiving a feedback voltage $V_{FB}$ from the load 160 via the feedback circuit 140, an eleventh node for providing the PWM signal $V_{PWM}$ of a switching frequency, and a twelfth node for receiving a current sensing signal $V_{CS}$ from the current sensing resistor 130. The PWM unit 106 adjusts the duty of the PWM signal $V_{PWM}$ in response to $V_{FB}$ and $V_{CS}$, so as to generate the output voltage $V_O$. To reduce power consumption of the power converter, the PWM unit 106 performs the frequency-reduction function by adjusting the switching frequency of the PWM signal $V_{PWM}$ in response to $V_{FB}$ in a way as illustrated in FIG. 2 that: the switching frequency starts to decrease from a first frequency $f_1$ when the feedback voltage $V_{FB}$ falls below the first threshold voltage $V_a$; the switching frequency stops decreasing and then remains at a second frequency $f_2$ when the feedback voltage $V_{FB}$ falls below the second threshold voltage $V_b$; and when the feedback voltage $V_{FB}$ falls below the third threshold voltage $V_c$, the PWM signal $V_{PWM}$ enters a green mode. The green mode can be a burst mode or a skipping mode, in which the PWM signal $V_{PWM}$ is active only once in a while. Besides, the PWM unit 106 performs the protection function, which will shut down the PWM signal $V_{PWM}$ when the protection signal $V_{PRTC}$ is active (at a high level).

The driver unit 107 is used for generating a driving signal $V_G$ to drive the power transistor 110 according to the PWM signal $V_{PWM}$.

The power transistor 110, illustrated as an NMOS transistor in the figure though, can also be implemented with a bipolar transistor. The power transistor 110 is used to control a power transmission of the power transmission unit 120 from $V_{IN}$ to the load 160.

The power transmission unit 120, which includes an auxiliary coil 121, a primary coil 122, a secondary coil 123, a diode 124, and a capacitor 125, is used to transmit power from $V_{IN}$ to $V_O$ for the load 160 under the control of the power transistor 110, and provide an auxiliary voltage $V_{AUX}$ from a terminal of the auxiliary coil 121. The auxiliary voltage $V_{AUX}$ will be equal to $-V_{IN}*(N_a/N_p)$ when the power transistor 110 is on, and equal to $V_O*(N_a/N_s)$ when the power transistor 110 is off, wherein $N_a$ is the turn number of the auxiliary coil 121, $N_p$ is the turn number of the primary coil 122, and $N_s$ is the turn number of the secondary coil 123.

The current sensing resistor 130 is used to convert a primary current $I_p$ to the current sensing signal $V_{CS}$.

The feedback circuit 140 is used to generate the feedback voltage $V_{FB}$ according to a difference between the output voltage $V_O$ and a reference voltage (not shown in the figure).

The first resistor 151, second resistor 152, diode 153, Zener diode 154, and thermal resistor 155 form a sense network for the protection function and the frequency-reduction function. The first resistor 151 has one end coupled with the auxiliary voltage $V_{AUX}$ and another end coupled with the voltage sense pin A. The second resistor 152 has one end coupled to the voltage sense pin A and another end coupled to a ground. The diode 153 has an anode coupled with the auxiliary voltage $V_{AUX}$. The Zener diode 154 has a cathode coupled with a cathode of the diode 153 and an anode coupled to the voltage sense pin A. The thermal resistor 155 has one end coupled with the cathode of the Zener diode 154 and another end coupled to the voltage sense pin A.

When the power transistor 110 is on, the auxiliary voltage $V_{AUX}$ will be equal to $-V_{IN}*(N_a/N_p)$ and the diode 153 will be off, and the voltage $V_X$ at the voltage sense pin A will be equal to $-V_{IN}*(N_a/N_p)*R_2/(R_1+R_2)+I_S*R_2$ and then sampled by the sampling unit 103 to serve as the second sampled voltage $V_{S2}$ for a frequency-reduction function, wherein $R_1$ is the resistance of the first resistor 151 and $R_2$ is the resistance of the second resistor 152, and $R_1$ is much larger than $R_2$.

When the power transistor 110 is off, the auxiliary voltage $V_{AUX}$ will be equal to $V_O*(N_a/N_s)$ for generating the voltage $V_X$ at the voltage sense pin A to serve as the first sampled voltage $V_{S1}$. If an abnormality in the power converter causes $V_O$ to rise abnormally and thereby make $V_O*(N_a/N_s)$ exceed an overvoltage threshold set by the diode 153 and the Zener diode 154, the diode 153 will be on, $V_X$ will be equal to $(V_O*(N_a/N_s)$–the overvoltage threshold), and $V_{S1}$ therefore will be higher than the reference voltage $V_t$ to make the protection signal $V_{PRTC}$ active (at a high level). Besides, if a high ambient temperature causes the resistance of the thermal resistor 155 to decrease to a value such that a great portion of the voltage $V_O*(N_a/N_s)$ falls across the second resistor 152, $V_{S1}$ will also be higher than the reference voltage $V_t$ to make the protection signal $V_{PRTC}$ active to shut down the PWM unit 106.

Figure 3:
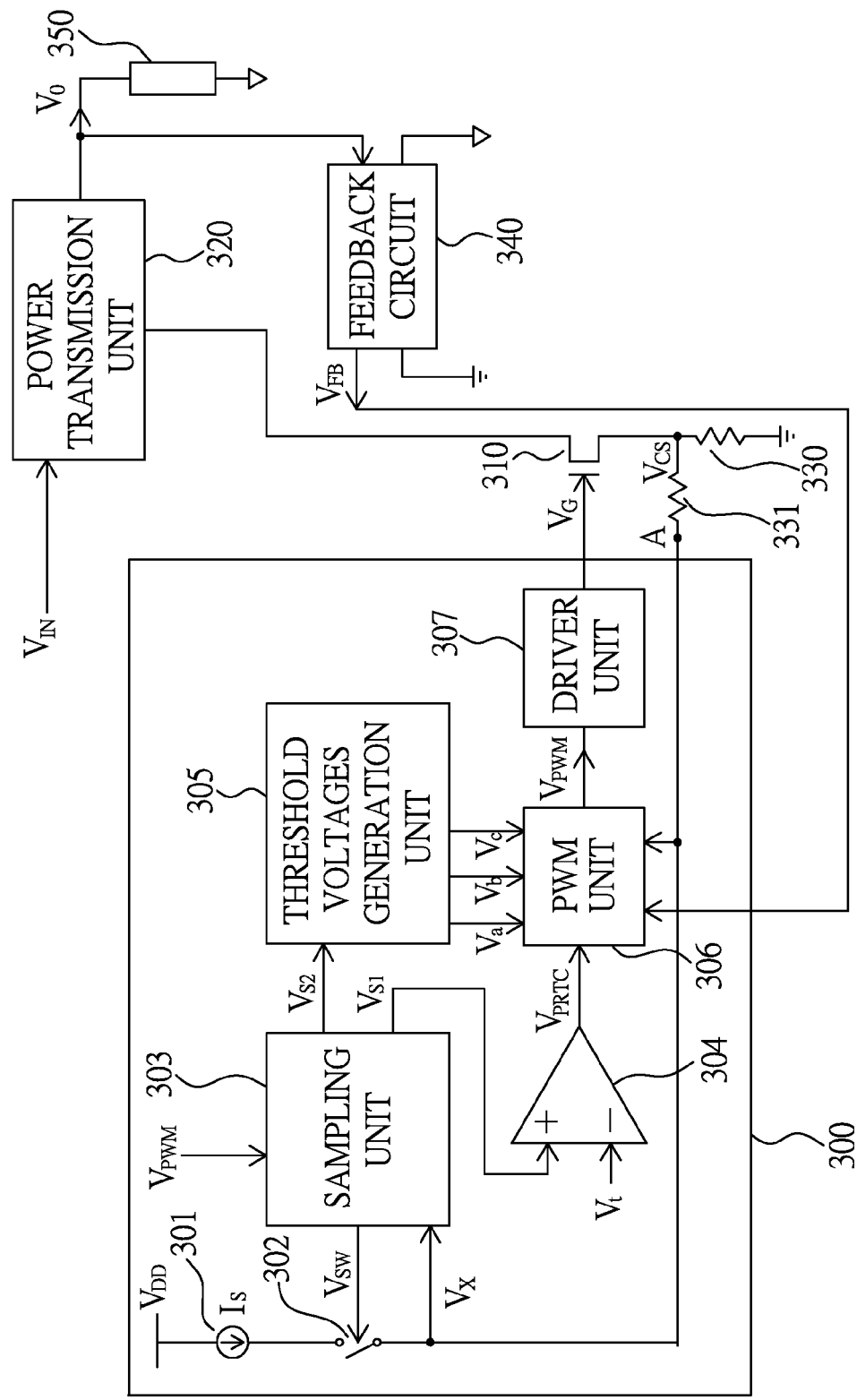
FIG. 3 illustrates another embodiment of the controller of the present invention used in a power conversion application.

Based on the principle elaborated above, the present invention proposes another embodiment. Please refer to FIG. 3, which illustrates another embodiment of the controller of the present invention used in a power conversion application. As illustrated in FIG. 3, a power converter includes a controller 300, a power transistor 310, a power transmission unit 320, a first resistor 330, a second resistor 331, and a feedback circuit 340. The power converter, converting an input voltage $V_{IN}$ to an output voltage $V_O$ for a load 350, provides a protection function and a frequency-reduction function via a single pin of the controller 300.

The controller 300, including a current source 301, a switch 302, a sampling unit 303, a comparator 304, a threshold voltages generation unit 305, a PWM unit 306, and a driver unit 307, has a voltage sense pin A for implementing the protection function and the frequency-reduction function.

The current source 301 is used to provide a current when the switch 302 is on.

The switch 302 has a first end coupled to the current source 301, a second end coupled to the voltage sense pin A of the controller 300, and a control end coupled with a control signal $V_{SW}$.

The sampling unit 303 has a first node coupled to the voltage sense pin A, a second node for providing the control signal $V_{SW}$, a third node for receiving a PWM signal $V_{PWM}$, a fourth node for providing a first sampled voltage $V_{S1}$, and a fifth node for providing a second sampled voltage $V_{S2}$. When the PWM signal $V_{PWM}$ is at a high level, the control signal $V_{SW}$ will be inactive and the switch 302 will be off, and the sampling unit 303 will sample a voltage $V_X$ at the voltage sense pin A to generate the first sampled voltage $V_{S1}$; when the PWM signal $V_{PWM}$ is at a low level, the control signal $V_{SW}$ will be active to switch on the switch 302, and the sampling unit 303 will sample the voltage $V_X$ at the voltage sense pin A to generate the second sampled voltage $V_{S2}$.

The comparator 304 has a positive input end coupled with the first sampled voltage $V_{S1}$, a negative input end coupled with a reference voltage $V_r$, and an output end for providing a protection signal $V_{PRTC}$.

The threshold voltages generation unit 305 has a sixth node for receiving the second sampled voltage $V_{S2}$, a seventh node for providing a first threshold voltage $V_a$ according to a first function of the second sampled voltage $V_{S2}$, a seventh node for providing a first threshold voltage $V_a$ according to a first function of the second sampled voltage $V_{S2}$, an eighth node for providing a second threshold voltage $V_b$ according to a second function of the second sampled voltage $V_{S2}$, and a ninth node for providing a third threshold voltage $V_c$ according to a third function of the second sampled voltage $V_{S2}$, wherein $V_a > V_b > V_c$. The first function, the second function, and the third function are preferably but not limited to first order polynomial functions. For example, $V_a$ can be equal to $K_1 * V_{S2} + V_{dc1}$, $V_b$ can be equal to $K_2 * V_{S2} + V_{dc2}$, and $V_c$ can be equal to $K_3 * V_{S2} + V_{dc3}$, wherein $K_1$, $K_2$, $K_3$, $V_{dc1}$, $V_{dc2}$, and $V_{dc3}$ are constants.

The PWM unit 306 has a tenth node for receiving a feedback voltage $V_{FB}$ from the load 350 via the feedback circuit 340, an eleventh node for providing the PWM signal $V_{PWM}$ of a switching frequency, and a twelfth node for receiving a current sensing signal $V_{CS}$ from the current sensing resistor 330. The PWM unit 306 adjusts the duty of the PWM signal $V_{PWM}$ in response to $V_{FB}$ and $V_{CS}$, so as to generate the output voltage $V_O$. To reduce power consumption of the power converter, the PWM unit 306 perform the frequency-reduction function by adjusting the switching frequency of the PWM signal $V_{PWM}$ in response to $V_{FB}$ in a way as illustrated in FIG. 2 that: the switching frequency starts to decrease from a first frequency $f_1$ when the feedback voltage $V_{FB}$ falls below the first threshold voltage $V_a$; the switching frequency stops decreasing and then remains at a second frequency $f_2$ when the feedback voltage $V_{FB}$ falls below the second threshold voltage $V_b$; and when the feedback voltage $V_{FB}$ falls below the third threshold voltage $V_c$, the PWM signal $V_{PWM}$ enters a green mode. The green mode can be a burst mode or a skipping mode, in which the PWM signal $V_{PWM}$ is active only once in a while. Besides, the PWM unit 306 performs the protection function, which will shut down the PWM signal $V_{PWM}$ when the protection signal $V_{PRTC}$ is active (at a high level).

The driver unit 307 is used for generating a driving signal $V_G$ to drive the power transistor 310 according to the PWM signal $V_{PWM}$.

The power transistor 310, illustrated as an NMOS transistor in the figure though, can also be implemented with a bipolar transistor. The power transistor 310 is used to control a power transmission of the power transmission unit 320 from $V_{IN}$ to the load 350.

The power transmission unit 320, which includes a primary coil, a secondary coil, a diode, and a capacitor (not shown in the figure, for they are connected in same way as those of the power transmission unit 120 of FIG. 1), is used to transmit power from $V_{IN}$ to $V_O$ for the load 350 under the control of the power transistor 310.

The first resistor 330 and the second resistor 331 form as a sense network, wherein the first resistor 330 has one end coupled with the power transistor 310 and another end coupled to a ground, the second resistor 331 has one end coupled with the power transistor 310 and another end coupled with the voltage sense pin A. The first resistor 330 is used to generate a voltage for the current sensing signal $V_{CS}$ and for serving as the voltage $V_X$ when the power transistor 310 is on; and the first resistor 330 and the second resistor 331 are used to generate the voltage $V_X$ at the voltage sense pin A when the power transistor 310 is off.

The feedback circuit 340 is used to generate the feedback voltage $V_{FB}$ according to a difference between the output voltage $V_O$ and a reference voltage (not shown in the figure).

When the power transistor 310 is off, the switch 302 will be on, and the voltage $V_X$ at the voltage sense pin A will be equal to $I_S * (R_1 + R_2)$ and then sampled by the sampling unit 303 to serve as the second sampled voltage $V_{S2}$ for the frequency-reduction function, wherein $R_1$ is the resistance of the first resistor 330 and $R_2$ is the resistance of the second resistor 331, and $R_2$ is much larger than $R_1$.

When the power transistor 310 is on, the switch 302 will be off, and the voltage $V_X$ will be equal to the current sensing signal $V_{CS}$ to serve as the first sampled voltage $V_{S1}$. If an abnormal large current flows through the first resistor 330 to cause the current sensing signal $V_{CS}$ to increase to make the first sampled voltage $V_{S1}$ exceed the reference voltage $V_r$, the protection signal $V_{PRTC}$ will be active (at a high level) to shut down the PWM unit 306.

With the designs elaborated above, the present invention possesses the following advantages:

1. The controller of the present invention is capable of providing a protection function and a frequency-reduction function using a single pin for power conversion applications.

2. The controller of the present invention is capable of providing a protection function and a frequency-reduction function for power conversion applications without the need of a larger pin count.

3. The controller of the present invention is capable of providing a system having a controller using a single pin to provide a protection function and a frequency-reduction function for power conversion applications.

While the invention has been described by way of example and in terms of preferred embodiments, it is to be understood that the invention is not limited thereto. To the contrary, it is intended to cover various modifications and similar arrangements and procedures, and the scope of the appended claims therefore should be accorded the broadest interpretation so as to encompass all such modifications and similar arrangements and procedures.

In summation of the above description, the present invention herein enhances the performance over the conventional structure and further complies with the patent application requirements and is submitted to the Patent and Trademark Office for review and granting of the commensurate patent rights.

What is claimed is:

1. A controller providing protection function and frequency-reduction function for a power conversion application, comprising:
a voltage sense pin;
a current source;
a switch having a first end coupled to said current source, a second end coupled to said voltage sense pin, and a control end coupled with a control signal;
a sampling unit having a first node coupled to said voltage sense pin, a second node for providing said control signal, a third node for receiving a PWM signal, a fourth node for providing a first sampled voltage, and a fifth node for providing a second sampled voltage, wherein when said PWM signal is at a first level, said control signal will be inactive and said switch will be off, and said sampling unit will sample a voltage at said voltage sense pin to generate said first sampled voltage; when said PWM signal is at a second level, which is different from said first level, said control signal will be active to switch on said switch, and said sampling unit will sample a voltage at said voltage sense pin to generate said second sampled voltage;
a comparator having a positive input end coupled with said first sampled voltage, a negative input end coupled with a reference voltage, and an output end for providing a protection signal;
a threshold voltages generation unit having a sixth node for receiving said second sampled voltage, a seventh node for providing a first threshold voltage according to a first function of said second sampled voltage, an eighth node for providing a second threshold voltage according to a second function of said second sampled voltage, and a ninth node for providing a third threshold voltage according to a third function of said second sampled voltage, wherein said first threshold voltage is higher than said second threshold voltage and said second threshold voltage is higher than said third threshold voltage; and
a PWM unit having a tenth node for receiving a feedback voltage from a load via a feedback circuit, and an eleventh node for providing said PWM signal of a switching frequency, wherein said PWM unit adjusts said switching frequency in response to said feedback voltage in a way that said switching frequency starts to decrease from a first frequency when said feedback voltage falls below said first threshold voltage, said switching frequency stops decreasing and then remains at a second frequency when said feedback voltage falls below said second threshold voltage, and said PWM signal enters a green mode when said feedback voltage falls below said third threshold voltage; and wherein said PWM unit will shut down said PWM signal when said protection signal is active.

2. The controller providing protection function and frequency-reduction function as claim 1, wherein said first function, said second function, and said third function are first order polynomial functions.

3. The controller providing protection function and frequency-reduction function as claim 1, wherein said green mode is selected from a group consisting of a burst mode and a skipping mode.

4. The controller providing protection function and frequency-reduction function as claim 1, further comprising a driver unit for generating a driving signal to drive a power transistor according to said PWM signal.

5. A system for a power conversion application, comprising:
a power transmission unit comprising an auxiliary coil, a primary coil, and a secondary coil for transmitting power from an input voltage to an output voltage for a load under a control a power transistor, and for providing an auxiliary voltage from a terminal of said auxiliary coil, wherein said auxiliary voltage will be proportional to a negative version of said input voltage when said power transistor is on, and proportional to said output voltage when said power transistor is off;
a controller providing a protection function and a frequency-reduction function, comprising:
a voltage sense pin;
a current source;
a switch having a first end coupled to said current source, a second end coupled to said voltage sense pin, and a control end coupled with a control signal;
a sampling unit having a first node coupled to said voltage sense pin, a second node for providing said control signal, a third node for receiving a PWM signal, a fourth node for providing a first sampled voltage, and a fifth node for providing a second sampled voltage, wherein when said PWM signal is at a low level, said control signal will be inactive and said switch will be off, and said sampling unit will sample a voltage at said voltage sense pin to generate said first sampled voltage; when said PWM signal is at a high level, said control signal will be active to switch on said switch, and said sampling unit will sample a voltage at said voltage sense pin to generate said second sampled voltage;
a comparator having a positive input end coupled with said first sampled voltage, a negative input end coupled with a reference voltage, and an output end for providing a protection signal;
a threshold voltages generation unit having a sixth node for receiving said second sampled voltage, a seventh node for providing a first threshold voltage according to a first function of said second sampled voltage, an eighth node for providing a second threshold voltage according to a second function of said second sampled voltage, and a ninth node for providing a third threshold voltage according to a third function of said second sampled voltage, wherein said first threshold voltage is higher than said second threshold voltage and said second threshold voltage is higher than said third threshold voltage;
a PWM unit having a tenth node for receiving a feedback voltage from said load via a feedback circuit, and an eleventh node for providing said PWM signal of a switching frequency, wherein said PWM unit adjusts said switching frequency in response to said feedback voltage in a way that said switching frequency starts to decrease from a first frequency when said feedback voltage falls below said first threshold voltage, said switching frequency stops decreasing and then remains at a second frequency when said feedback voltage falls below said second threshold voltage, and said PWM signal enters a green mode when said feedback voltage falls below said third threshold voltage; and wherein said PWM unit will shut down said PWM signal when said protection signal is active; and
a driver unit for generating a driving signal to drive said power transistor according to said PWM signal; and
a sense network, comprising:
a first resistor having one end coupled with said auxiliary voltage and another end coupled with said voltage sense pin;

a second resistor having one end coupled to said voltage sense pin and another end coupled to a ground;
a diode having an anode coupled with said auxiliary voltage;
a zener diode having a cathode coupled with a cathode of said diode and an anode coupled to said voltage sense pin; and
a thermal resistor having one end coupled with said cathode of said zener diode and another end coupled to said voltage sense pin.

6. The system for a power conversion application as disclosed in claim 5, wherein said first resistor has a resistance higher than said second resistor.

7. The system for a power conversion application as disclosed in claim 5, wherein said first function, said second function, and said third function are first order polynomial functions.

8. The system for a power conversion application as disclosed in claim 5, wherein said green mode is selected from a group consisting of a burst mode and a skipping mode.

9. A system for a power conversion application, comprising:
a power transmission unit for transmitting power from an input voltage to an output voltage for a load under a control a power transistor;
a controller providing a protection function and a frequency-reduction function, comprising:
a voltage sense pin;
a current source;
a switch having a first end coupled to said current source, a second end coupled to said voltage sense pin, and a control end coupled with a control signal;
a sampling unit having a first node coupled to said voltage sense pin, a second node for providing said control signal, a third node for receiving a PWM signal, a fourth node for providing a first sampled voltage, and a fifth node for providing a second sampled voltage, wherein when said PWM signal is at a high level, said control signal will be inactive and said switch will be off, and said sampling unit will sample a voltage at said voltage sense pin to generate said first sampled voltage; when said PWM signal is at a low level, said control signal will be active to switch on said switch, and said sampling unit will sample a voltage at said voltage sense pin to generate said second sampled voltage;
a comparator having a positive input end coupled with said first sampled voltage, a negative input end coupled with a reference voltage, and an output end for providing a protection signal;
a threshold voltages generation unit having a sixth node for receiving said second sampled voltage, a seventh node for providing a first threshold voltage according to a first function of said second sampled voltage, an eighth node for providing a second threshold voltage according to a second function of said second sampled voltage, and a ninth node for providing a third threshold voltage according to a third function of said second sampled voltage, wherein said first threshold voltage is higher than said second threshold voltage and said second threshold voltage is higher than said third threshold voltage;
a PWM unit having a tenth node for receiving a feedback voltage from said load via a feedback circuit, and an eleventh node for providing said PWM signal of a switching frequency, wherein said PWM unit adjusts said switching frequency in response to said feedback voltage in a way that said switching frequency starts to decrease from a first frequency when said feedback voltage falls below said first threshold voltage, said switching frequency stops decreasing and then remains at a second frequency when said feedback voltage falls below said second threshold voltage, and said PWM signal enters a green mode when said feedback voltage falls below said third threshold voltage; and wherein said PWM unit will shut down said PWM signal when said protection signal is active; and
a driver unit for generating a driving signal to drive said power transistor according to said PWM signal; and
a sense network, comprising:
a first resistor having one end coupled with said power transistor and another end coupled to a ground; and
a second resistor having one end coupled with said power transistor and another end coupled with said voltage sense pin.

10. The system for a power conversion application as disclosed in claim 9, wherein said second resistor has a resistance higher than said first resistor.

* * * * *